Oct. 7, 1969  H. G. KOSLOWSKI ET AL  3,471,082
CORDLESS JACQUARD CARD COPYING MACHINE
FOR ENDLESS PAPER CARDS

Filed Sept. 19, 1967  6 Sheets-Sheet 1

INVENTORS:
Hans Günter Koslowski
Walter Schmetz
Alexander Zamps
BY

Oct. 7, 1969   H. G. KOSLOWSKI ET AL   3,471,082
CORDLESS JACQUARD CARD COPYING MACHINE
FOR ENDLESS PAPER CARDS
Filed Sept. 19, 1967   6 Sheets-Sheet 2
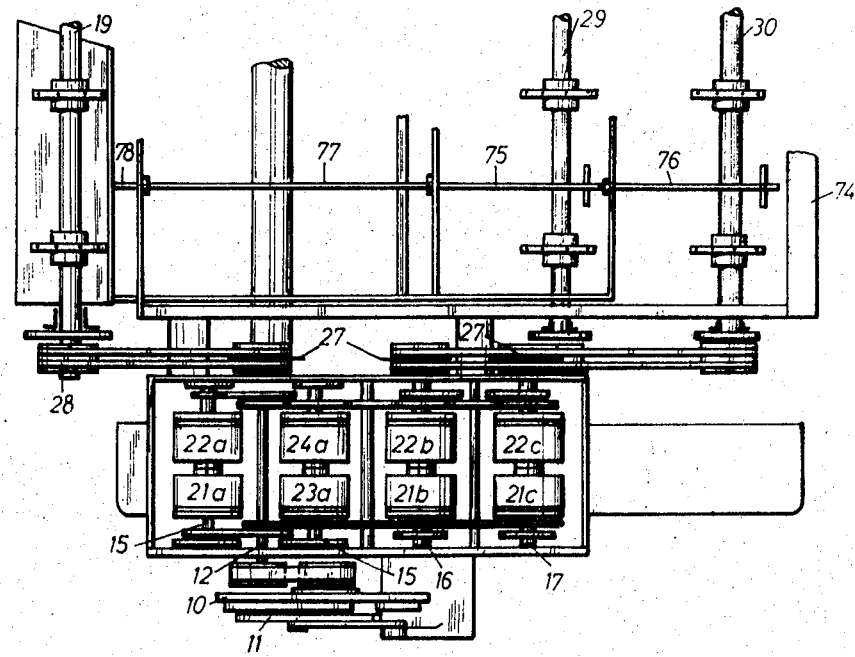
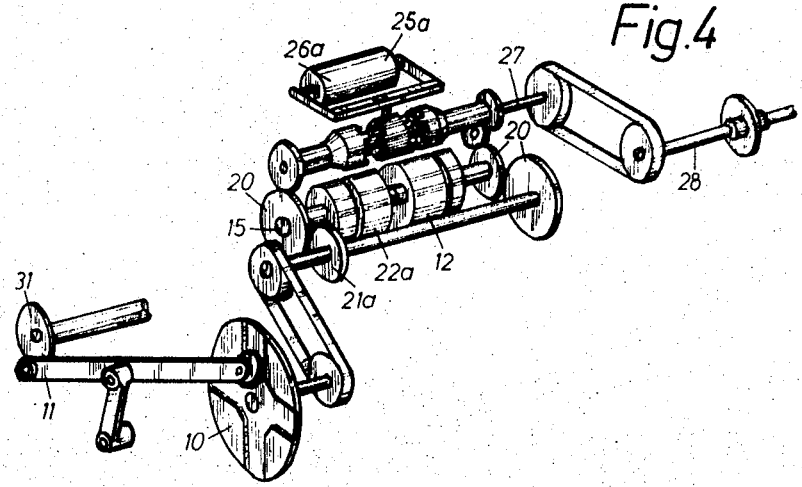
INVENTORS:
Hans Günter Koslowski
Walter Schmelz
Alexander Zangs
BY INVENTORS:
Hans Günter Koslowski
Walter Schmetz
BY Alexander Zangs

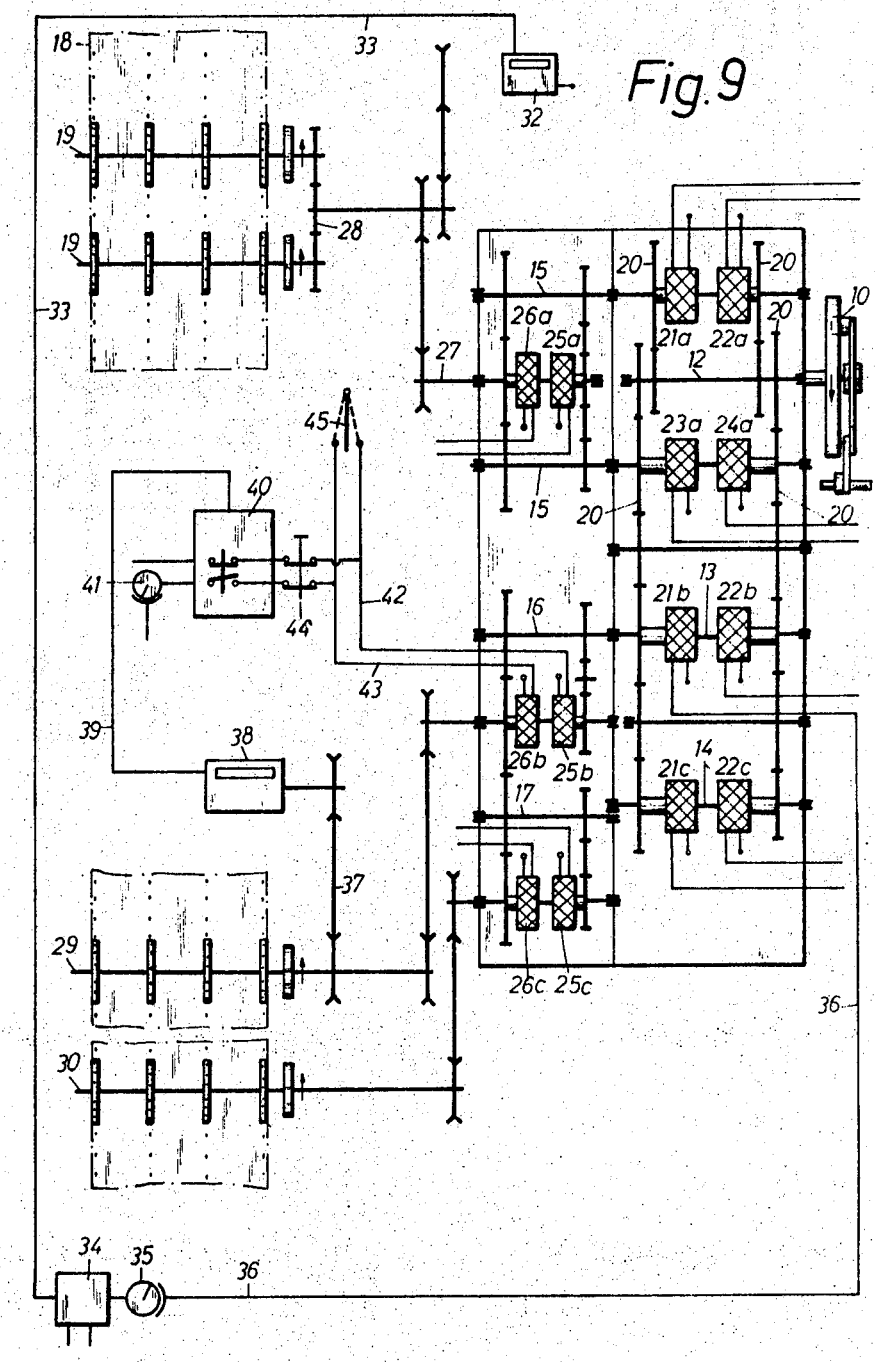

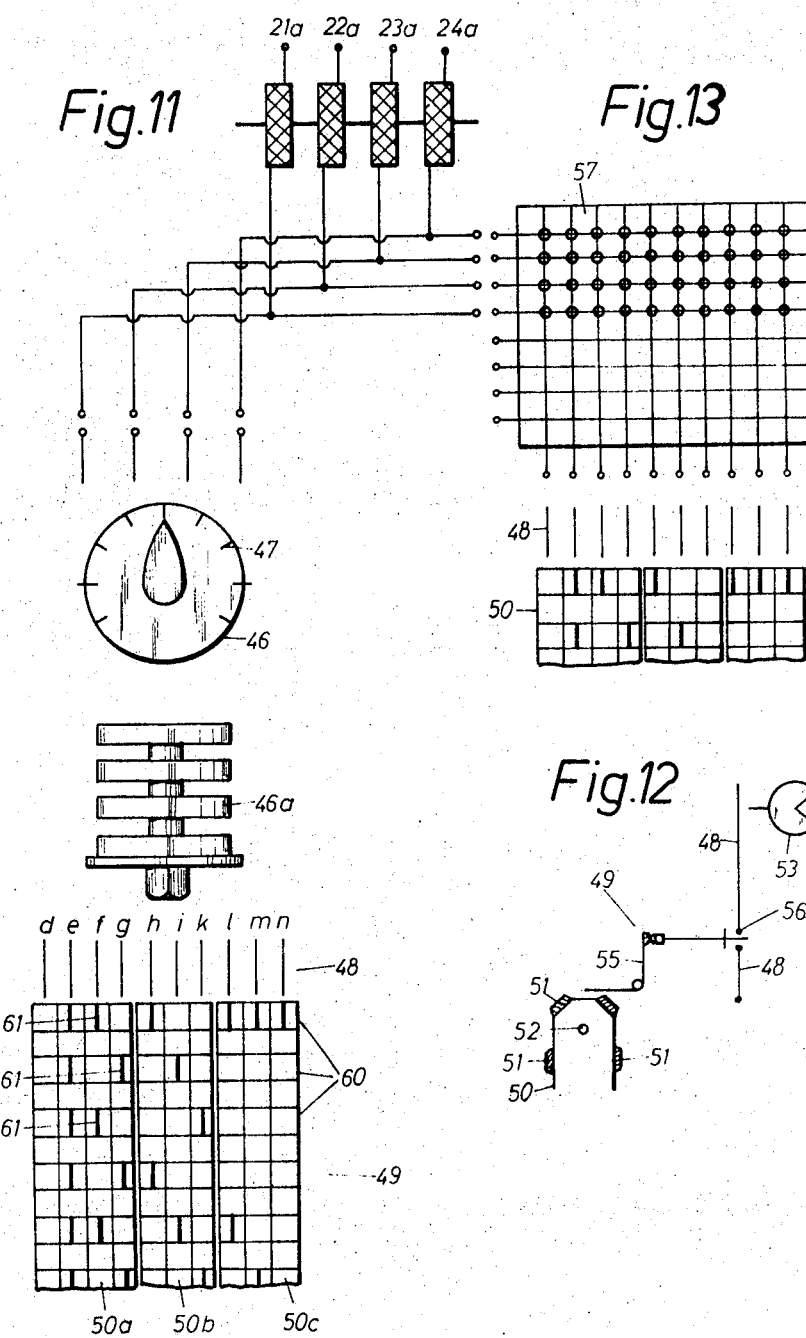

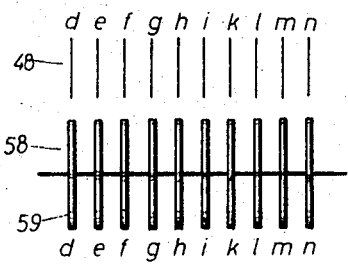
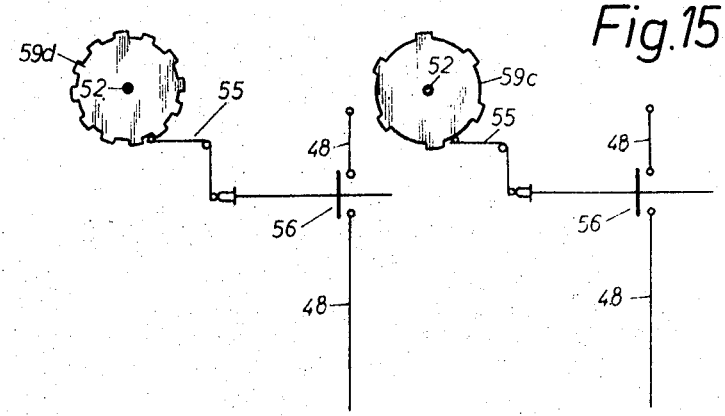
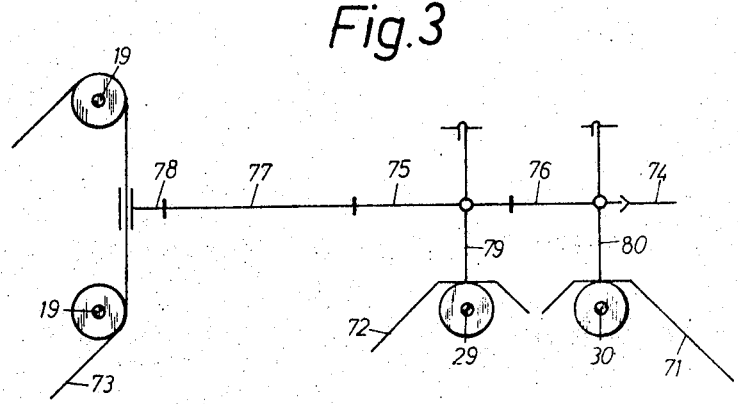

United States Patent Office 3,471,082
Patented Oct. 7, 1969

3,471,082
CORDLESS JACQUARD CARD COPYING
MACHINE FOR ENDLESS PAPER CARDS
Hans Gunter Koslowski, Walter Schmetz, and Alexander
Zangs, Krefeld, Germany, assignors to Maschinenfabrik Carl Zangs Aktiengesellschaft, Krefeld, Germany
Filed Sept. 19, 1967, Ser. No. 668,863
Int. Cl. G06k 1/16, 1/14; B26f 1/04
U.S. Cl. 234—18                                9 Claims

ABSTRACT OF THE DISCLOSURE

Cordless Jacquard card copying machine for endless paper cards in which cylinders for punched cards or tapes and a cylinder for the card or tape to be punched are driven intermittently with the punching mechanism from a drive means through forward and reverse transmissions which are under the control of electrically operated clutches.

---

The present invention concerns a cordless Jacquard card copying machine for endless paper cards with a control transmission by means of which the shafts of the paper card cylinders are controlled by electric clutches.

Control devices are known in copying machines for endless paper cards for advancing the cylinder shafts by one or more units of the angle degree of a weft card, which control devices operate with so-called hook controls. These hook controls will at high acceleration bring about a jerky and shock-like operation, and the stresses are increased multifold when the copying machine is employed as copying reading-in machine (Levier machine) in which the cylinder at the input and output side are within the limited time period for the control operation, advanced by a multiple of the control angle of the weft card. In view of this operation of the hook control, the masses of the paper cards, as well as the cylinder peg holes of the paper cards which convey the drive which positively cooperate with the pegs on the cylinder shaft are at high acceleration subjected to jerky and shock-like stresses so that the said peg holes widen or are damaged, whereby the safe guiding of the paper card in the matrix is lost. Since, with the heretofore customary hook controls, the pulling hooks, for instance successively with three shocks for a quadruple control act upon the cylinder shaft a damage of the peg holes cannot be avoided. Such machines, therefore, are unable to operate at a speed exceeding 65–95 revolutions per minute.

It is an object of the present invention so to improve machines of the type involved that it will be possible better and more economically to exploit the complicated and expensive coyping machines by increasing their speed.

It is another object of this invention to provide a Jacquard copying machine of the above mentioned type which will avoid the heretofore necessary installation and removal of pull rods or a change of driving gears as it was necessary heretofore with machines employing a hook control when it was desired to change over to a different multiple control type or when changing the control sequence. Heretofore, when changing the direction of rotation of the cylinder control, screw connections had to be disconnected and the hook control had to be rotated by 180°.

It is, therefore, another object of this invention to make it possible to convert machines of the above mentioned type to the different control types and control sequences of the cylinders at the input and output side in conformity with various products in the weaving art or the card cutting art. Heretofore it was not possible to change a set certain control type or direction of rotation of a cylinder shaft during the running of the machine in conformity with the weft card number, and consequently in conformity with the controls of any desired cylinder shaft at the input side or the output side.

These and other objects and advantages of the invention will appear more clearly from the following specification in connection with the accompanying drawings, in which:

FIG. 2 is a top view of a portion of the copying machine shown in FIG. 1.

FIG. 3 is a diagrammatic illustration of the transmission mechanism comprising the various pins for feeding the pre-cards and punching the finished cards.

FIG. 4 is a perspective illustration of a portion of the control transmission.

FIG. 9 diagrammatically illustrates the arrangement of a centrally arranged Geneva cross control transmission with coupling cam transmission and with following transmissions for the various cylinder shafts of a copying machine with two cylinders on the input side.

Figure 10:
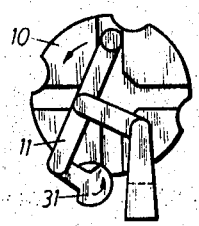

FIG. 10 is the front view of the Geneva cross hollow wheel control transmission of FIG. 9.

FIG. 11 illustrates a pre-selector arranged between the clutches for the multiple control transmission of the cylinder shafts and the electric current paths of the programming mechanism.

FIG. 12 illustrates the operation of the programming mechanism.

FIG. 13 shows the cross rail distributor which may take the place of the pre-selector of FIG. 11.

FIG. 14 shows a contact disc mechanism which may be used instead of the programming mechanism.

FIG. 15 illustrates the working method of the contact disc mechanism.

Over the heretofore known designs, therefore, a new conception of the copying reading-in machine was required in order to realize the above mentioned objects. More specifically, the above mentioned objects have been realized according to the present invention by replacing the heretofore customary control of cordless copying machines for endless paper cards by electrically controllable clutches which act upon any desired control drives or reversible drives of the individual paper card cylinder shafts. According to the present invention, it is furthermore suggested, to employ as control transmissions the well known Geneva cross transmissions or Geneva cross hollow wheel transmissions with or without coupling short drive which, especially at high speeds permit a jerk and shock-free operation. Moreover, a centrally arranged and continuously working Geneva cross control mechanism is provided for all cylinder shafts at the input and output side followed by transmissions and reversible transmissions for each cylinder shaft. In this way, it will be possible with only one control mechanism to bring about any desired independent multiple control, a non-control or a reversing of the direction of rotation by the provided control by electric couplings, for instance, magnetic couplings, for all cylinder shafts. The design according to the invention will also assure that when the rather short period of time which remains over the time for the punching out operation of the weft card within a revolution of the shaft driving the pressing mechanism of the copying machine there will still be possible a shifting of the transmission at full speed of the copying machine without interfering movements of the masses of the control members.

In order to permit a fast shift-over of the copying machine from one control type and control sequence to another, it is furthermore suggested according to the invention to connect the current supply conduits of the electric clutches for each of the respective cylinder shafts at the input and output side with a pre-selector switch known per se or with cross rail distributors known per se which may be equipped with plug or programming plate contacts. The said current supply conduits may, on the other hand, be connected to the current paths of a programming mechanism adapted to produce electric current impulses for obtaining the desired control type and control sequence. The current impulses may also be produced by contact discs which are individually provided for each current path and are combined in fixedly installed or exchangeable contact rollers or contact disc mechanisms. In view of the various contact points of the pre-selector which may be designed as step switch comprising a plurality of contact planes, it will be possible to make effective any desired combination of the control sequence indicated on the information carrier chains of the programming mechanism or on the contact rollers with the multiple control types of the transmissions for each of the cylinders on the input and output side.

The direct composition of the primarily customary control types and control sequences of the individual cylinder shafts will make the exchange of the information signs or information carrier chains as well as the change of the contact disc mechanisms superfluous with the exception of a few instances. Since the reversible transmissions pertaining to the transmission drives are in conformity with the present invention likewise equipped with electric clutches, also the shift-over to another direction of rotation of the cylinder shafts by any desired electric control will be possible. This will, for instance, permit, during the operation of the copying machine when a contour is to be copied symmetrically, to reverse the direction of rotation of the contour card cylinder located at the input side. To this end, adjustable contact releasing counters known per se are provided which are driven in conformity with the number of the controlled weft cards mechanically or electronically by paper card cylinder shafts at the input or output side which effect the control of the clutches for the reversible transmission associated with the contour card cylinder after the preset weft card number has been reached. Similarly, it is advantageous in conformity with the number of weft cards of the cylinder at the output side, to control a cylinder at the input side with regard to its control type when, for instance, for a sample dependent weft number only one and the same punched contour card is required which cooperates with the second cylinder on the input side as binding card cylinder. In this instance the pattern depending weft card number is adjusted on a contact releasing adjustable counter of the cylinder on the output side and actuates, for instance when the adjusted weft card number has been reached, the electric clutch which is provided for a simple advance of the cylinder on the input side which cylinder operates as a contour card cylinder. The copying of the cards may thus be continued without interruption of the copying machine because the weft card which corresponds to the further contour cross section of the fabric will be available by advancing the contour card cylinder within one revolution of the press work shaft of the copying machine. Thus, care has been taken that an economic exploitation of the copying machine will be obtained without any time losses.

Figure 1:
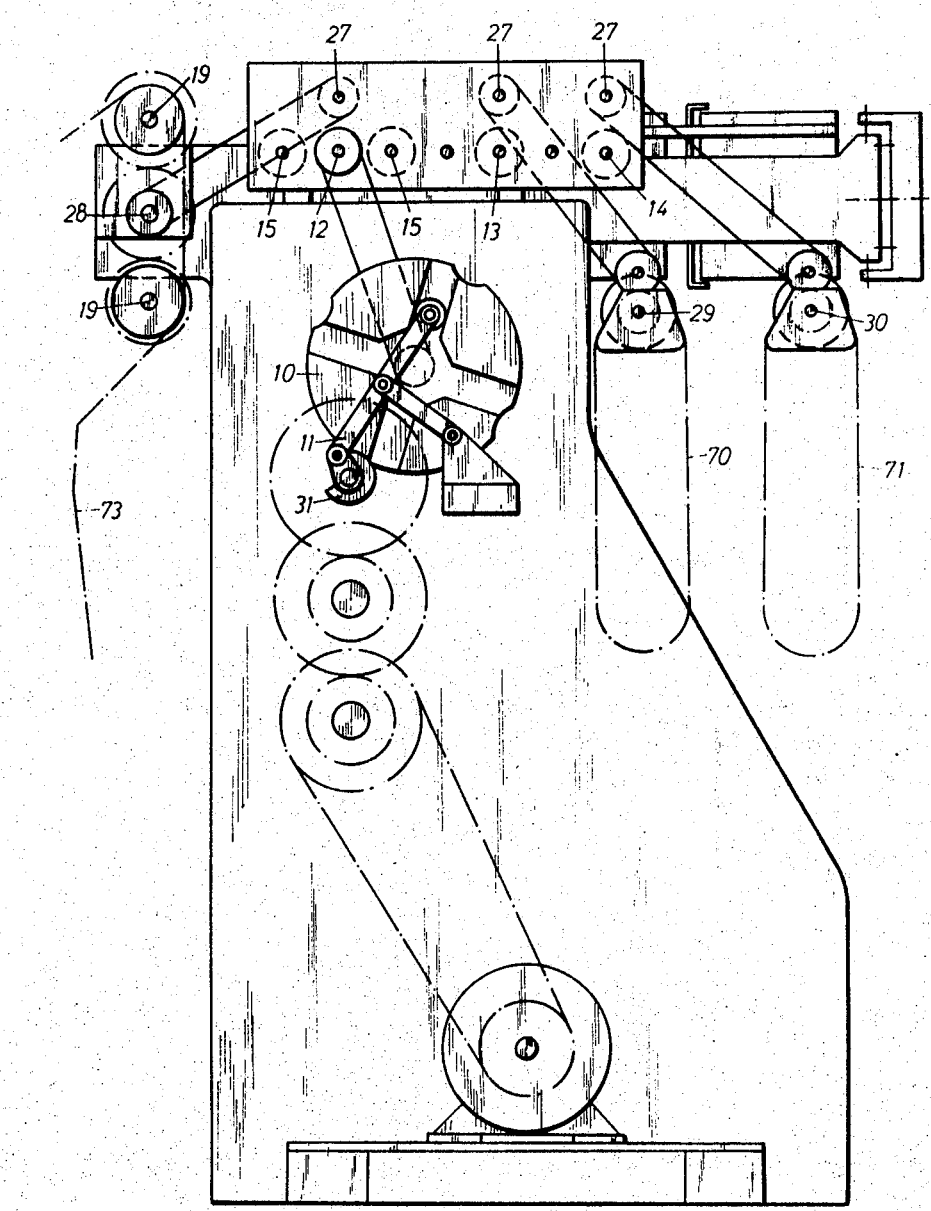
FIG. 1 is a side view of the entire copying machine.

Referring now to the drawings in detail, the copying machine shown in FIG. 1 comprises two cylinder shafts 29 and 30 which are arranged on the input side and on which pre-cards 70 and 71 are arranged the perforation picture of which is to be conveyed to the finish card or tape 73. This finish card 73 passes over two cylinder shafts 19 arranged on the output side. The perforation of the finish card 73 is effected by a printing grid 74 (Druckrechen) which through the intervention of two head needles 75 and 76 actuates a printing needle 77 action upon a stamp 78. An actuation of the stamp 78 is effected only when the two head needles 75, 76 are in alignment with each other. These head needles 75 and 76 are adjusted by droppers 79 and 80 in conformity with the perforations in the two pre-cards 70 and 71. The arrangement of this transfer mechanism is shown in FIG. 2 and also diagrammatically in FIG. 3.

Figure 5:
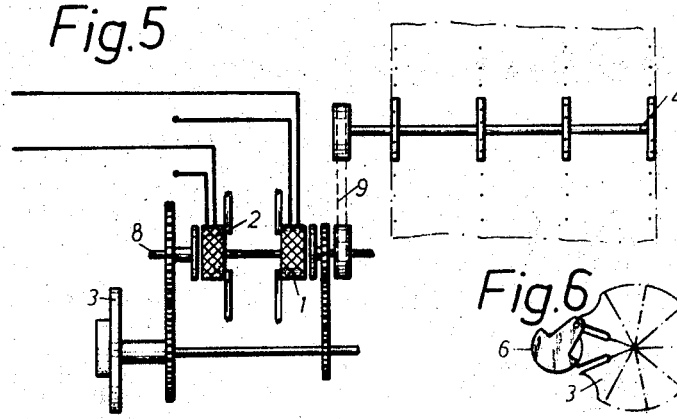
FIG. 5 is a side view of a control transmission arranged on a cylinder shaft of the copying machine and, more specifically, being designed as Geneva cross control transmission.
Figure 6:
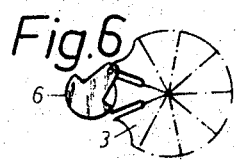
FIG. 6 is the front view of the control transmission shown in FIG. 5.

FIG. 5 shows the arrangement of electric clutches which may, for instance, be designed in the form of electromagnetic clutches. Clutch 1 is arranged for the normal direction of rotation of the cylinder shaft 4, and clutch 2 is arranged for the opposite direction of rotation of the cylinder shaft 4 between a Geneva cross transmission 3 and a paper card cylinder shaft 4 at the input or output side.

Figure 7:
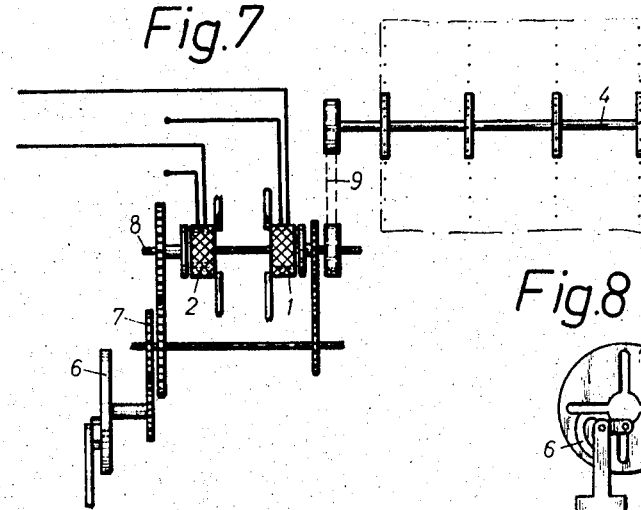
FIG. 7 is a side view of a Geneva cross hollow wheel control transmission arranged on the cylinder shaft of the copying machine.
Figure 8:
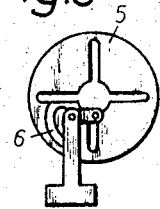
FIG. 8 is the front view of the control transmission shown in FIG. 7.

FIG. 7 shows the corresponding arrangement with a Geneva cross hollow wheel transmission 5, 6. With each rotation of the press mechanism shaft of the copying machine, the follower discs of the Geneva cross transmission perform one revolution so that with each revolution a shifting of the cylinder shaft 4 by one weft card is effected through the intervention of correspondingly designed transmission wheels 7. The connection between the clutch shaft 8 and the cylinder shaft 4 is effected for instance by a toothed belt 9.

FIG. 9 shows a centrally arranged Geneva cross transmission which is designed as Geneva cross hollow wheel transmission 10 with coupling cam drive 11 (FIG. 10) which latter for each cylinder shaft is followed by a transmission 12, 13, 14 for the multiple control and by a reversible transmission 15, 16, 17 for the reversing of the direction of rotation. The cylinder at the output side, also called press mechanism cylinder, passes the paper card 18 over two parallelly driven cylinder shafts 19. For the cylinder shafts 19 at the output side there is provided a multiple control transmission 12 which permits a single, double, triple or quadruple control of the angle degree of a weft card. To this end, the transmission 12 with its different correspondingly stepped gears 20 cooperates with the electrically controlled clutches 21a for the single control, 22a for the double control, 23a for the triple control and 24a for the quadruple control in such a way that in response to the actuation of one of the clutches 21, 22, 23 or 24 a single, double, triple or quadruple control is effected on the cylinder shafts 19 by an angle degree of a weft card. A similar operation is effected by the reversible transmission 15 with its, for instance, electrically controlled clutches 25a for the normal direction of rotation, and 26a for the opposite direction of rotation so that when engaging the magnetic clutches 26a and disengaging the magnetic clutch 25a, the transmission shaft 27 on the output side will change its direction of rotation. The control movement will in this instance be transmitted, for instance, by means of gears 28 onto the cylinder shafts 19.

Similarly, the cylinder shafts 29, 30 at the input side can be controlled independently and at will by means of the transmissions 13 and 14 following the common Geneva cross wheel control transmission 10 and the reversing transmission 16 and 17 pertaining thereto. According to the embodiment illustrated in the drawing, the cylinder shafts 29 and 30 on the input side have in addition to the reversible transmissions only one multiple transmission for a single and double control. The single control is effected by the magnetic clutch 21b or 21c whereas the double control is effected by the magnetic clutch 22b or 22c. Inasmuch as the driving crank 31 (FIG. 10) of the Geneva hollow cross control transmission here serving as drive with coupling cam drive operates continuously in conformity with the main shaft of the copying machine actuating the pressing mechanism, it is possible to control each cylinder shaft 19, 20 and 30 independently of each other and in any desired manner of the mutilple control forwardly or rearwardly by the provided electric clutches. Furthermore, the electrically controlled clutches permit a change in the direction of rotation or the selection of a control type in conformity with the well known contact releasing counter mechanism which are mechanically or electrically coupled to the cylinder shafts and which close an electric contact when a set weft card number has been reached.

Thus, for instance, the counter mechanism 32 is mechanically coupled to the cylinder shafts 19 on the output side. When reaching a certain weft card number, the coupling magnet 21b in transmission 13 is through conductor 36 via conductor 33 and by the interposition of a relay 34 and a timer 35 controlled by a machine shaft. Since this magnetic clutch brings about a single control, a single shifting of the cylinder shaft 29 connected thereto will be effected. If this cylinder shaft 29 arranged at the input side is used as contour card cylinder shaft, the contour card cylinder is advanced by a weft card in conformity with the number of the weft cards copied at the output side. This means that the contour card is thus caused to advance when the contour comprises a certain change in the cross section and a new weft card has to be fed to the contour card cylinder. When the new weft card is fed to said contour card cylinder, it will be appreciated that with the next rotation of the counter mechanism which cooperates with the cylinder shaft 19 on the output side, no circuit is closed which means that the contour card remains at a standstill and operates in proper sequence via the two cylinder Levier or reading in device with the cylinder shaft 30 working as binding card cylinder. Similarly, the cylinder shaft 29 of the input side may mechanically or electronically be connected through a gear transmission 39 with an adjustable contact releasing counting mechanism 38. After a certain weft card number has been reached, the relay 40 is controlled through a line 39 and through the intervention of a machine controlled timer 41 simultaneously turns off the current supply to clutch 25b which controls the normal direction of rotation of the transmission, and the current supply to clutch 26b is turned on which clutch 26 controls the opposite direction of rotation. The current supply to the magnetic clutches 25b and 26b is effected through lines 42 and 43.

When the cylinder shaft 29 is used as contour card cylinder shaft, and when the counting mechanism 38 is so adjusted that with the completion of one contour the direction of rotation of the cylinder shaft 29 is changed, as a result thereof the new prepared card copies on the paper card 18 of the cylinder shafts 19 on the output side will form a symmetric picture of the contour produced up to the reversing point of the set of cards on the contour card cylinder 29.

If no automatic reversal by a counting mechanism is provided for obtaining symmetric contour pictures in a set of cards provided for processing purposes, it is also possible manually to engage the clutches 25b and 26b when the magnetic relay 40 is turned off by switch 44. Similar remarks also apply to the electromagnetic reversing clutches 25a and 26a and 25c and 26c.

Similarly, it is possible for all cylinder shafts 19, 29, 30 to provide adjustable contact releasing counting mechanisms which are connected mechanically or electronically, and in conformity with a certain place within the textile pattern bring about a reversal in order in this way to carry-out the copying and reading in operations in a continuous manner without the necessity of stopping the machine and manually setting a certain multiple control or a certain direction of rotation.

FIG. 11 shows the arrangement of a pre-selector switch 46 for the cylinder shaft 19 at the output side. The pertaining electromagnetic clutches 21a, 22a, 23a and 24a which bring about the various multiple controls are, as diagrammatically illustrated, in the pre-selector switch 46 via ten switch positions 47 through the various switch planes 46a of the pre-selector switch 46 (said planes 46a being shown in side view) connected to the current paths 48d, e, f, g, h, i, k, l, m, n of a programming mechanism 49 which is shown diagrammatically and produces electric current impulses.

FIG. 12 diagrammatically illustrates the operation of the programming mechanism 49 in which by means of information carriers 51 on the information carrier chain 50 for each current path, an angle lever 55 will through contact connections 56 close a current path 48. The information carrier chain 50 may be driven either continuously at the same revolution as the press work shaft of the copying machine while the information carrier marks (FIG. 12) either in a manner known per se by means of their shape also control the timely start of the current impulses in conformity with the drive shaft 52 of the continuously shifting programming mechanism, or a programming mechanism may be employed which shifts stepwise and the current path of which passes through a special timer 54 controlled by machine shaft 53.

Even though the information carrier chain 50 has three separate information belts 50a, 50b, 50c which are provided for special control sequences for the individual cylinder shafts 19, 29, 30 (FIG. 9) and thus can be adjusted independently of each other with regard to each other and also may comprise a different repeat length of the shifting sequence, it is possible by means of the pre-selector switch 46, according to the requirements, to connect with a provided multiple control type 21a, 22a, 23a and 24a for the cylinder shaft 19, the respective required control sequence which is effected by the insertion or non-insertion of an information carrier 51 on the information carrier chain 50 and produces corresponding current impulses in the current paths 48d and 48n. Since the cylinder shafts 19, 29, 30 at the input and output side respectively have a pre-selector switch in a corresponding arrangement with the electrically controlled clutches pertaining thereto, the pre-selector switches, in conformity with the requirements, permit the selection of a required control sequence (produced by current impulses in the current paths 48d–48n) for the respective multiple clutches and to engage the same for the respective copying operation without an exchange of the information carrier belts, when a corresponding control sequence is set on one of the belts. In this way the placing of a new information carrier chain 50 is practically limited to unusual instances.

The pre-selector switches 46 also permit combinations, for instances of two or three current paths 48d–48n, which are respectively connected to one of the clutches 21a, 22a, 23a and 24a when a corresponding combination is provided for a switch point 47 in the terminals of the switch planes 46a. The condition to be met, however, for establishing a combination of the various current paths is that only one current impulse of a current path 48 acts upon any desired member 60 of the combined current paths. Thus, it is possible, for instances, that a switch point 47 is connected on one hand with the current path 48f and the multiple clutch 21a and at the same time via a switch plane of the same switch point 47 the current path 48a is connected with the multiple clutches 23a. Since for these two current paths 48f and 48g only one current impulse 61 acts upon each member 60 of the information chain, the following control types and control sequences in the rhythm of the rotation of the main shaft of the press mechanism of the copying machine are obtained for the cylinder shaft 19: single control: triple control: single control: triple control. A triple combination possibility of current paths and thus control sequences on one hand and multiple controls on the other hand is obtained for instance in the following manner: the current path 48h works in the following control sequence: control: non-control: non-control etc. The current path 48*i* operates in the same control sequence way. The start of the control sequence is in this instance, however, offset by a member 60 of the information chain 50. The current path 48*k* operates in the same control sequence way. The start of the control is, however, offset by a further member 60 of the information carrier chain 50. When these three current paths *h, i, k* are connected with different multiple control arrangements, for instance 48*h* with clutch 21*a* (single), 48*i* with clutch 22*a* (double), 48*k* with clutch 24*a* (quadruple), each individual current path alone will via the corresponding switch point 47 result in the following control and control sequence, single control: non-control: non-control or double control: non-control: non-control or quadruple control: non-control: non-control. The timely start of the control is offset by one revolution of the press work shaft but by a corresponding placement of the belt 50*b* upon the programming mechanism 49 can be controlled for the start in a desired manner. When these three current paths with the magnetic multiple control clutches connected thereto are together placed upon a switch point 47 as mentioned above, the following control and control sequence for the cylinder 19 will be obtained: single control: double control: quadruple control: single control: double control: quadruple control etc. Correspondingly, this control possibility also prevails for the remaining cylinder shafts 29 and 30 with the limitation to the provided transmission arrangement 13, 14 and the thus obtained multiple control through the clutches 21*b* and 21*c* as well as 22*b* and 22*c*.

FIG. 13 shows that instead of the pre-selector switch 46 (FIG. 11) also cross rail distributors 47 may be employed which are equipped with plug contacts (not shown) or programming plate contacts.

Finally, FIG. 14 diagrammatically shows a contact disc mechanism 58 with contact discs 59*d*–59*n* which have their circumference provided with elevations and depressions in conformity with the current impulses and control sequences desired. The contact disc mechanism 58 may replace a programming mechanism 49 and will thus in the same manner as described above produce current impulses in the current paths 49*d*–48*n*.

The equipping of a copying machine with the contact disc mechanism 58 shown in FIG. 14 is limited to the control sequences which are provided on the contact discs 59*d*–59*n*. The design of a copying machine with a programming mechanism 49 according to FIG. 11 permits any type of control sequence through the information carriers 51 on the information carrier chains 50 for any current path 48*d*–48*n*. The design of a copying machine with a pre-selector device 46 permits the instantaneous setting of a certain control sequence and control type through the switch points 47 of the pre-selector switch 46 for instance ten selected control type and control sequence combinations as they customarily are encountered with copying machines. The design of the copying machine with a cross rail distributor 57 according to FIG. 13 instead of the pre-selector switch according to FIG. 11, in combination with a programming mechanism 49, permits any desired combination of control types and control sequences within the frame work of the multiple control possibilities in the transmission.

It is, of course, to be understood that the present invention is, by no means, limited to the particular embodiments referred to above but also comprises any modifications within the scope of the appended claims.

What is claimed is:

1. A machine for transferring punched hole patterns to a tape from punched means in the form of at least one member having a hole pattern punched therein which comprises; punching means for punching said tape and under the control of said punched means, drive means operable for periodically actuating said punching means, cylinders for feeding said punched means and tape, and means for actuating said cylinders in the interval between successive actuations of said punching means and including an intermittent drive effective during said interval, forward driving and reverse driving transmissions connected to said cylinders, and electrically actuated clutches in the drive trains leading from said intermittent drive to the respective said cylinders via said transmissions and operable to control the connection of said cylinders to said intermittent drive.

2. A machine according to claim 1 in which said drive trains comprises a Geneva drive means.

3. A machine according to claim 1 in which said intermittent drive comprises a Geneva drive common to all said transmissions.

4. A machine according to claim 3 which includes programming means connected in controlling relation to said clutches for controlling the rotation of said respective cylinders.

5. A machine according to claim 3 in which each forward driving transmission has at least two output speeds and a said clutch pertaining to each output speed, and counter means driven by one of said cylinders and operable to control the last mentioned clutches.

6. A machine according to claim 3 in which each reverse driving transmission has a said clutch pertaining thereto, counter means driven by one of said cylinders for controlling the last mentioned said clutches, and manual switch means also operable for controlling said clutches.

7. A machine according to claim 4 in which said programming means comprises a selector switch for each cylinder and connected to the clutches pertaining to the respective cylinder.

8. A machine according to claim 7 in which said programming means comprises a cross rail distributor connected to said clutches.

9. A machine according to claim 4 in which said programming means comprises disc means and switches controlled thereby and connected to said clutches.

References Cited

UNITED STATES PATENTS

| 1,666,900 | 4/1928 | Hodgson | 234—65 |
| 1,732,982 | 10/1929 | Neville | 234—65 X |
| 1,745,019 | 1/1930 | Korn | 234—65 |
| 3,228,599 | 1/1966 | Haberstroh | 234—129 |
| 3,319,881 | 5/1967 | Loflen | 234—59 |

WILLIAM S. LAWSON, Primary Examiner

U.S. Cl. X.R.

234—65, 62, 80, 129